(12) United States Patent
Lin et al.

(10) Patent No.: US 11,552,549 B2
(45) Date of Patent: Jan. 10, 2023

(54) SHORT PULSE GATE SIGNAL VOLTAGE BALANCING IN SERIES-CONNECTED MOSFETS

(71) Applicant: VIRGINIA TECH INTELLECTUAL PROPERTIES, INC., Blacksburg, VA (US)

(72) Inventors: Xiang Lin, Blacksburg, VA (US); Dong Dong, Blacksburg, VA (US); Rolando Burgos, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/064,080

(22) Filed: Oct. 6, 2020

(65) Prior Publication Data

US 2022/0109363 A1    Apr. 7, 2022

(51) Int. Cl.
*H02M 1/08*    (2006.01)
*H02M 1/00*    (2006.01)

(52) U.S. Cl.
CPC .......... *H02M 1/08* (2013.01); *H02M 1/0051* (2021.05); *H02M 1/0054* (2021.05)

(58) Field of Classification Search
CPC .... H02M 1/0051; H02M 1/0054; H02M 1/08; H02M 1/38
See application file for complete search history.

(56) References Cited

U.S. PATENT DOCUMENTS

| | | | |
|---|---|---|---|
| 10,637,348 B1* | 4/2020 | Wu | H02M 1/08 |
| 2018/0302085 A1* | 10/2018 | Xie | H03K 17/693 |
| 2020/0162074 A1* | 5/2020 | Niikura | H03K 17/04123 |

(Continued)

OTHER PUBLICATIONS

Keiji Wada and Katsuya Shingu, Voltage Balancing Control for Series Connected MOSFETs Based on Time Delay Adjustment under Start-Up and Steady-State Operations, Date of Conference: Sep. 23-27, 2018, Published in: 2018 IEEE Energy Conversion Congress and Exposition (ECCE), pp. 5495-5499 (Year: 2018).*

(Continued)

*Primary Examiner* — Alex Torres-Rivera
(74) *Attorney, Agent, or Firm* — Thomas | Horstemeyer, LLP

(57) ABSTRACT

A voltage balancing circuit for use in a power converter is described. In one example, a power converter includes series-connected switching transistors for power conversion, and a voltage balancing control loop. The voltage balancing control loop includes a measurement circuit electrically coupled to a transistor in the pair of series-connected switching transistors. The measurement circuit is electrically coupled to measure a body voltage reference of the transistor. The voltage balancing control loop also includes a balancing circuit configured to generate a balancing pulse signal for adjusting a voltage across the transistor using the body voltage reference, and a circuit configured to combine the balancing pulse signal with a gate drive pulse signal for the transistor, to form a balanced gate drive pulse signal for the transistor. The balanced gate drive pulse signal helps to equalize the body diode voltages of the series-connected switching transistors, particularly during "off" periods.

20 Claims, 5 Drawing Sheets

(56) References Cited

U.S. PATENT DOCUMENTS

2021/0351686 A1* 11/2021 Bognanni ............... H02M 1/08

OTHER PUBLICATIONS

Inhwan Lee; Lu Yue; Xiu Yao, Voltage Balancing Control with Active Gate Driver for Series Connected SiC MOSFETs, Date of Conference: Sep. 29-Oct. 3, 2019, 2019 IEEE Energy Conversion Congress and Exposition (ECCE), pp. 3235-3239 (Year: 2019 ).*

Ranyue Li; Chaoli Wang; Dongyuan Zhao, Voltage-Balancing Method for Series-Connected IGBTs Based on FPGA, Date of Conference: Nov. 26-29, 2015, Published in: 2015 5th International Conference on Electric Utility Deregulation and Restructuring and Power Technologies (DRPT), pp. 2191-2194 (Year: 2015).*

Vechalapu, Kasunaidu, Subhashish Bhattacharya, and Eddy Aleoiza. "Performance evaluation of series connected 1700V SiC MOSFET devices." 2015 IEEE 3rd Workshop on Wide Bandgap Power Devices and Applications (WiPDA). IEEE, 2015.

He, Yiou, and David J. Perreault. "Diode evaluation and series diode balancing for high-voltage high-frequency power converters." IEEE Transactions on Power Electronics (2019).

* cited by examiner

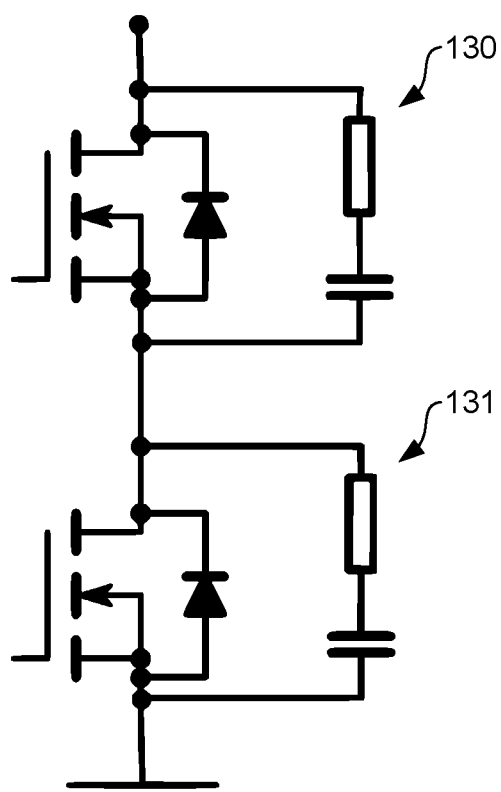 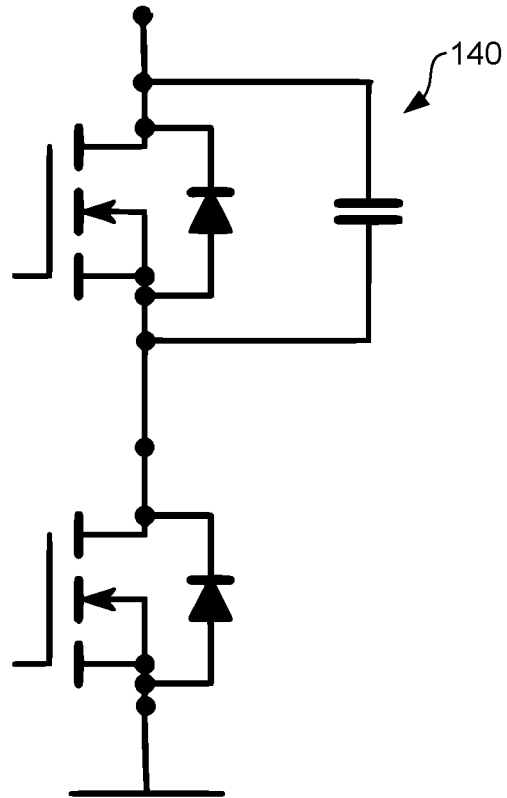
FIG. 3A  FIG. 3B

SHORT PULSE GATE SIGNAL VOLTAGE BALANCING IN SERIES-CONNECTED MOSFETS

FEDERALLY SPONSORED RESEARCH STATEMENT

This invention was made with government support under Grant No. 418514 awarded by PowerAmerica. The government has certain rights in the invention.

BACKGROUND

Power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including arrangements of diodes, synchronous rectifiers, switching transistors, transformers, and control loops, can be used.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments.

FIGS. 3A and 3B illustrate example circuits for body diode voltage balancing in power transistors according to various embodiments described herein.

DETAILED DESCRIPTION

Figure 1:
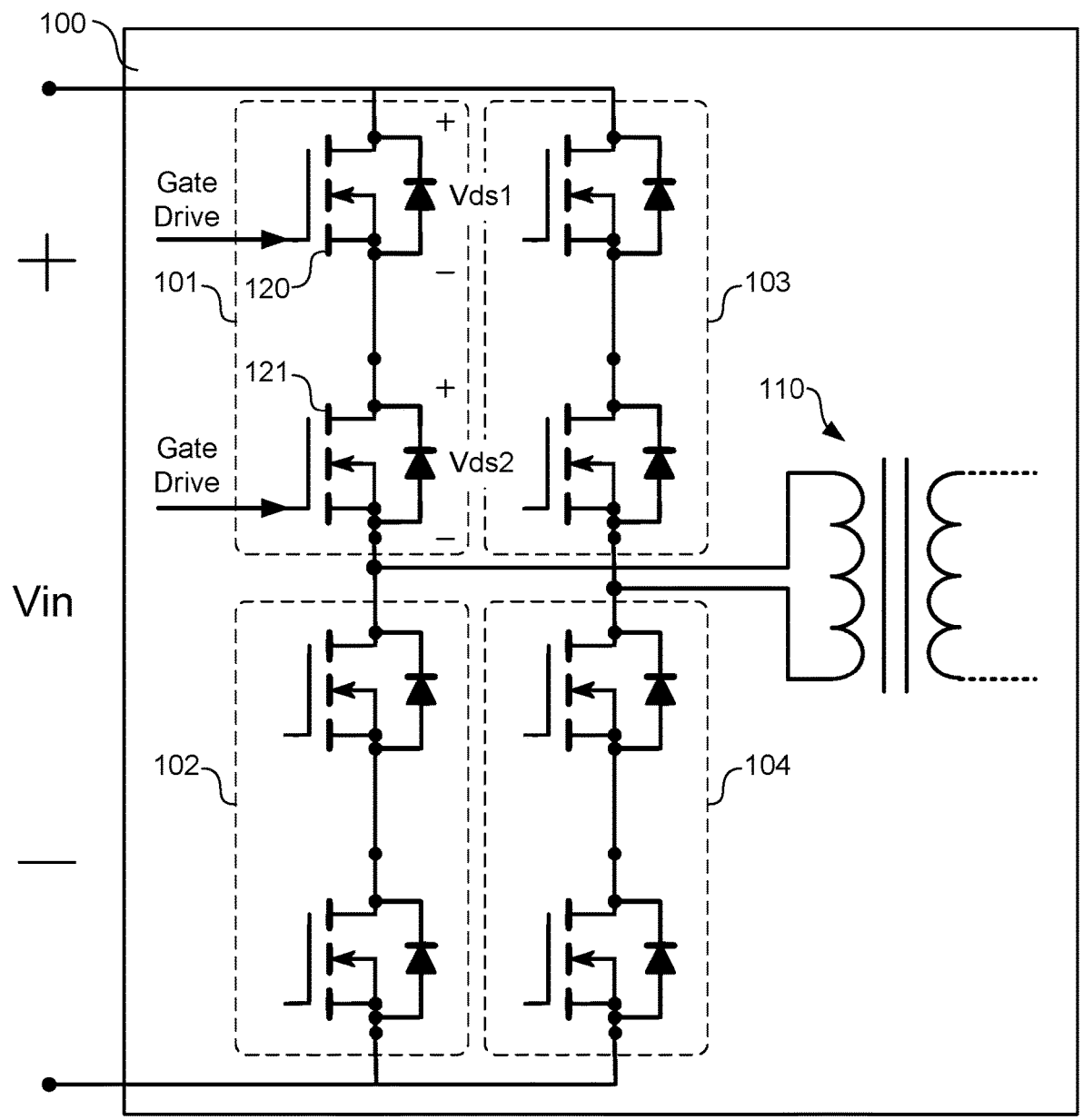
FIG. 1 illustrates parts of a representative power converter according to various embodiments described herein.

As noted above, power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including arrangements of diodes, synchronous rectifiers, switching transistors, transformers, and control loops, can be used.

Power converters are often designed for a particular purpose. New, higher power converters can now be realized with wide bandgap semiconductors, which are now being manufactured using a number of different types of wide bandgap semiconductor materials. Wide bandgap power transistors are now being used in power converters to handle the conversion of more power with smaller converter designs. Depending upon the topology and purpose, a power converter can include any number of switching power transistors.

As an alternative to silicon metal oxide semiconductor field effect transistors (MOSFETs), silicon carbide (SiC) MOSFETs offer higher blocking voltages, lower on-state resistances, and higher thermal conductivity. The SiC MOSFETs can replace silicon MOSFETs and integrated gate bipolar transistors (IGBTs) in many applications. Other types of wide bandgap MOSFETs, such as gallium nitride (GaN) MOSFETs, also offer similar benefits to SiC MOSFETs and are being adopted in new designs.

A number of wide bandgap power transistor modules are now commercially available. An example power module may include four, six, or eight SiC or GaN MOSFETs, all integrated in a single power module. The integration of these power transistors into a single power module has significantly facilitated the reduction of power losses and heat dissipation. The integration has also resulted in increased power density in power converters.

Like a conventional silicon power MOSFET, a wide bandgap power MOSFET has a parasitic body diode coupled between the drain and the source of the device. The body diode is intrinsic to the structure of power MOSFETs. Many applications for power MOSFETs, including power converters, rely upon power MOSFETs in either half- or full-bridge configurations, driving inductive loads. When a power MOSFET is turned off in these applications, the inductor will try to maintain current, applying a voltage across the body diode of the MOSFET. It is important to design such systems so that the voltage does not result in reverse breakdown of the body diode of the MOSFET during operation.

To increase power handling in power converters, a pair of series-connected power MOSFETs offers an attractive solution as compared to a single power MOSFET as a switching unit. Series-connected power MOSFETs can be relied upon to simplify multi-level power converters to two-level converters, for example, for medium voltage applications, so the cost of the power converter can be reduced significantly with less power modules. Additionally, series-connected power MOSFETs can be relied upon to increase (e.g., to about double) the reverse breakdown voltage of the body diode in a switching unit in a power converter, particularly as compared to a single power MOSFET switching unit.

However, body diode voltage sharing among series-connected power MOSFETs is one main problem when using series-connected MOSFETs. Uneven body diode voltage sharing can be attributed to the lack of uniformity among the parasitic capacitors and other device parameters and characteristics between the two series-connected MOSFETs.

In the context outlined above, a voltage balancing circuit for use in a power converter is described herein. In one example, a power converter includes series-connected switching transistors for power conversion, and a voltage balancing control loop. The voltage balancing control loop includes a measurement circuit electrically coupled to a transistor in the pair of series-connected switching transistors. The measurement circuit is electrically coupled to measure a body voltage reference of the transistor. The voltage balancing control loop also includes a balancing circuit configured to generate a balancing pulse signal for adjusting a voltage across the transistor using the body voltage reference, and a circuit configured to combine the balancing pulse signal with a gate drive pulse signal for the transistor, to form a balanced gate drive pulse signal for the transistor. The balanced gate drive pulse signal helps to equalize the body diode voltages of the series-connected switching transistors, particularly during "off" periods.

Turning to the drawings, FIG. 1 illustrates parts of a representative power converter 100 according to various embodiments described herein. The power converter 100 is illustrated in FIG. 1 as a representative example of a power converter for discussion. The power converter 100 omits certain components from view, for simplicity. The embodiments described herein can be used in and applied to many different types of power converters. For example, while an example full bridge converter is illustrated in FIG. 1, the embodiments are not limited to use with full bridge converters or any particular topology of power converter.

Among other components, the power converter 100 includes a first switching unit 101, a second switching unit 102, a third switching unit 103, and a fourth switching unit 104. The first switching unit 101 and the second switching unit 102 form a first leg of the power converter 100, arranged in series between the input voltage Vin, as shown in FIG. 1. The second switching unit 103 and the third switching unit 104 form a second leg of the power converter 100, arranged in series between the input voltage Vin, as shown in FIG. 1.

The first switching unit 101 includes a pair of series-connected switching transistors. Particularly, the first switching unit 101 includes a first power transistor 120 and a second power transistor 121 arranged in a series connection. The power transistors 120 and 121 can be embodied as any suitable power transistors for the purpose of the power converter 100, including (but not limited to) wide bandgap power transistors such as SiC or GaN MOSFETs. However, the voltage balancing embodiments described below can be applied to other types of power transistors to reduce body diode voltage mismatches among series-connected switching transistors.

The use of the first power transistor 120 and the second power transistor 121 as the first switching unit 101 increases the reverse breakdown voltage of the first switching unit 101, as compared to using a single power transistor as the first switching unit 101. This facilitates the use of higher voltages and power in the power converter 100.

As shown in FIG. 1, the drain of the first power transistor 120 is electrically coupled to the positive terminal of the input voltage Vin, and the source of the first power transistor 120 is electrically coupled to the drain of the second power transistor 121. The source of the second power transistor 121 is electrically coupled to the second switching unit 102. Each of the switching units 102-104 also includes a similar pair of series-connected switching transistors as shown in FIG. 1.

The power converter 100 also includes a transformer 110, with the primary winding of the transformer 110 connected between the switching units 101-104. One end of the primary winding is connected between the first switching unit 101 and the second switching unit 102, and another end of the primary winding is connected between the third switching unit 103 and the fourth switching unit 104.

The drain-to-source voltage for the first power transistor 120 is identified as Vds1 in FIG. 1, and the drain-to-source voltage for the second power transistor 121 is identified as Vds2 in FIG. 1. Ideally, Vds1 and Vds2 would be the same, both while the transistors 120 and 121 are turned on and turned off. However, particularly when turned off, the body diode voltages (e.g., Vds1 and Vds2) may not be the same between the transistors 120 and 121. Uneven body diode voltage sharing can be attributed, at least in part, to the lack of uniformity among the parasitic capacitors and other device characteristics of the transistors 120 and 121. If the difference in voltage sharing becomes too unbalanced, one or both of the transistors 120 and 121 can be damaged (and possibly fail). This unbalance in Vds1 and Vds2 is most pronounced when the gate drive to the transistors 120 and 121 turns the transistors 120 and 121 off. In this case, the primary of the transformer 110 will try to maintain the current flowing in it, resulting in conducting of switching unit 102 and a large voltage across the transistors 120 and 121 which may not be shared or spread equally between the transistors 120 and 121.

Figure 2:
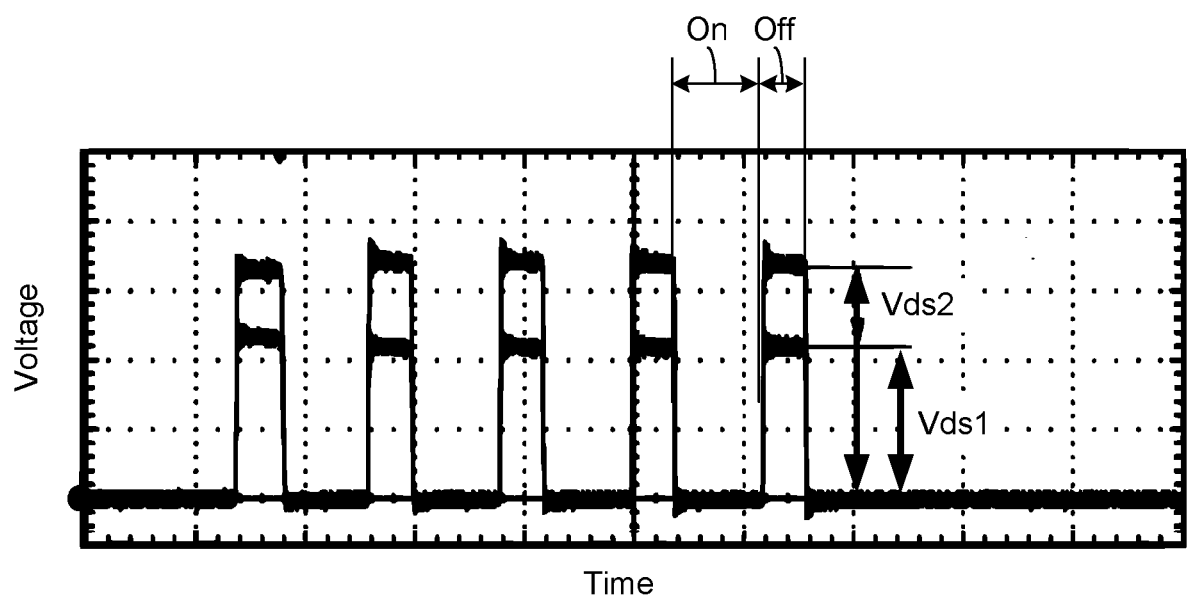
FIG. 2 illustrates example drain to source voltages of power transistors according to various embodiments described herein.

FIG. 2 illustrates example Vds1 and Vds2 voltages of the transistors 120 and 121, over time. A number of on/off cycles or periods of the transistors 120 and 121 are shown in FIG. 2. During the on cycles, the Vds1 and Vds2 voltages across the body diodes of the transistors 120 and 121 are very low, as the transistors 120 and 121 are conducting. During the off cycles, the Vds1 and Vds2 voltages are higher, as the transistors 120 and 121 are off (e.g., blocking) and not conducting.

As shown in FIG. 2, the Vds1 and Vds2 voltages are not balanced or equal during the off cycles. Instead, Vds2 is significantly larger than Vds1, meaning that the body diode voltage across the transistor 121 is larger than the body diode voltage across the transistor 120 during the off cycles. Thus, as shown in FIG. 2, equal voltage sharing cannot be assumed among the transistors 120 and 121 during off periods, and the power converter 100 should be designed to account for this issue. Unfortunately, because of the manufacturing variations in the parasitic capacitors and other characteristics of power switching transistors (even of the same type), it is relatively difficult to account for the range of variations. Any design that attempts to account for the full range of parasitic variations in power switching transistors will necessarily be lower power, less efficient, more costly, or exhibit some related combination of undesirable characteristics.

Compensation for unequal body diode voltage sharing among series-connected switching transistors is an important concern, and a number of different techniques have been attempted to compensate for it. FIGS. 3A and 3B illustrate example circuits for body diode voltage balancing in power transistors according to various embodiments described herein. Particularly, in FIG. 3A, passive snubbers 130 and 131 are coupled to series-connected switching transistors. Each passive snubber 130 and 131 includes a resistor and capacitor branch in parallel with the body diode of the transistor. In FIG. 3B, an extra capacitor 140 is coupled to one of the transistors in a pair of series-connected switching transistors.

The techniques shown in FIGS. 3A and 3B have been widely adopted, although they have drawbacks. The passive snubbers 130 and 131 in FIG. 3A slow down the turn-off speed of the transistors, but increase the loss of the body diodes in the transistors. The extra capacitor 140 can be added to one of the two transistors as shown in FIG. 3B, to mitigate (e.g., equalize) the difference in parasitic capacitances among the series-connected switching transistors. With balanced parasitic capacitances, voltage sharing can be improved. However, the correct placement and selection of the additional capacitor 140 depends upon a measurement of the parasitic capacitances in each of the transistors separately, which requires customized manufacturing processes.

As compared to the approaches shown in FIGS. 3A and 3B, active voltage balancing is preferred for better voltage sharing and less dependence on circuit parameters. However, active control is needed at the gate of one or both of the transistors for active voltage balancing of series-connected switching transistors. Some implementations of active voltage balancing rely upon extra, active balancing circuitry to impact the turn-off process of the transistors. Conventional active balancing techniques have been undesirable because of the associated, additional costs.

A new method of active balancing described herein involves the introduction of an extra, short gate pulse signal during the turn off period of one or both of the transistors in series-connected switching transistors. In this approach, the transistor is partly turned on for a short period, to affect the turn off process of the body diode in the transistor.

This type of active control has not been proposed before, because of a number of technical difficulties. First, any extra gate pulse signal requires very precise adjustment, because it will partly turn on the transistor with high switching speed. Slight differences of duration may lead to overcompensation for voltage balancing. Second, the delay time between the turn off period of the body diode in the transistor and the extra gate pulse signal will vary with different turn off currents in the power converter, so it is relatively difficult to determine the timing for the extra gate pulse signal to appropriately affect the turn off transient. In order to address these difficulties and achieve active voltage balancing for series-connected body diodes, a short pulse based voltage balancing approach with corresponding circuit is proposed for series-connected switching transistors.

Figure 4:
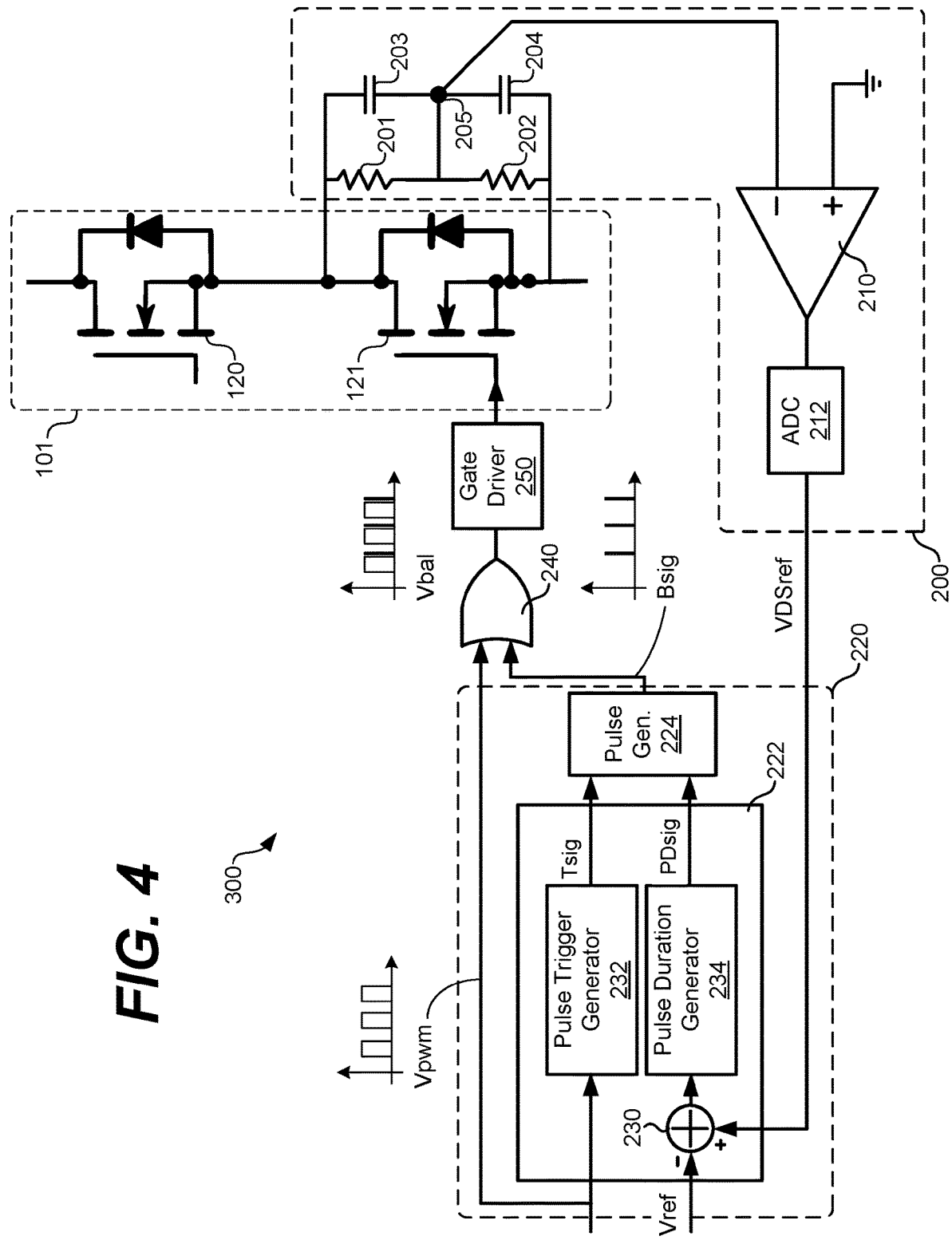
FIG. 4 illustrates parts of a representative power converter with a voltage balancing circuit according to various embodiments described herein.

FIG. 4 illustrates parts of a representative power converter 300 with a voltage balancing circuit according to various embodiments described herein. The power converter 300 is illustrated in FIG. 4 as a representative example of a power converter for discussion. The power converter 300 omits certain components from view, for simplicity. The embodiments described herein can be used in and applied to many different types and topologies of power converters.

In FIG. 4, the first switching unit 101 of the power converter 100 from FIG. 1 is shown. The voltage balancing circuit operates on the second power transistor 121 in the first switching unit 101, as the second power transistor 121 is assumed to have a higher Vds voltage during off cycles in the example. However, the voltage balancing circuit could operate on the first power transistor 120 in other examples. Additionally, although not shown in FIG. 4, the voltage balancing circuit can be applied to other switching units of the power converter 100, including one or more of the switching units 102-104 (see FIG. 1).

The voltage balancing circuit includes a measurement circuit 200, a balancing circuit 220, and combining logic 240. In one example, the measurement circuit 200 includes a voltage divider of resistors 201 and 202 coupled between the drain and the source of the transistor 121. The measurement circuit 200 also includes a pair of series-connected capacitors 203 and 204 coupled between the drain and the source of the transistor 121. In other cases, the measurement circuit 200 can be realized with a longer string of series connected resistors (e.g., three or more) and a longer string of series-connected capacitors (e.g., three or more). The measurement circuit 200 also includes a difference amplifier 210 and an analog to digital converter (ADC) 212.

In the example shown, the inverting input of the difference amplifier 210 is electrically coupled to the node 205 between the resistors 201 and 202 in the voltage divider. The difference amplifier 210 reads a body voltage reference of the transistor 121 at the node 205. In some cases, the arrangement of the voltage divider and series-connected capacitors can vary as compared to that shown in FIG. 4. For voltage balancing control of the transistor 121, the difference amplifier 210 should be electrically coupled to measure the voltage potential at the drain, the source, or across the drain and source of the transistors 121, using any suitable electrical coupling.

The difference amplifier 210 is configured to provide a referenced body voltage for the transistor 121 based on the body voltage reference. In one example, the difference amplifier 210 can be embodied as any suitable differential or operational amplifier capable of referencing (i.e., comparing and finding the difference) the body voltage reference of the transistor 121 to ground potential, to provide a ground-referenced body voltage. In another example, the difference amplifier 210 can reference the body voltage reference of the transistor 121 to the source terminal voltage of the difference amplifier 210, rather than ground potential as shown in FIG. 3. In either case, referenced body voltage can be converted into digital format by the ADC 212 for input to the balancing circuit 220.

The ADC 212 is configured to convert the referenced body voltage output from the difference amplifier 210, which is an analog signal, to digital-format body voltage signal VDSref, as shown in FIG. 4. The analog to digital converter 212 can be embodied as any suitable analog to digital converter with a sufficient effective number of bits for the purpose. The body voltage signal VDSref is provided as an input to the balancing circuit 220.

The balancing circuit 220 includes a controller 222 and a balancing pulse signal generator 224. The controller 222 can be embodied as an integrated circuit controller, such as a field programmable gate array (FPGA), a microcontroller, or other processing circuitry, including memory. The controller 222 implements difference logic 230, a pulse trigger generator 232, and a pulse duration generator 234.

The difference logic 230 receives a voltage reference signal Vref and the body voltage signal VDSref. The difference logic 230 outputs the difference of those signals as an input to the pulse duration generator 234. The voltage reference signal Vref can be embodied as a separately-generated digital voltage reference signal. The duration of the balancing pulse signal Bsig and, thus, the amount of off cycle body diode voltage change, can be controlled based on Vref, as described below.

The pulse duration generator 234 is configured to generate a pulse duration signal PDsig based on the output of the difference logic 230. PDsig is a signal representative of the length or time duration of the extra, short gate pulse signal generated by the balancing circuit 220 for the turn off cycle period of the transistor 121. PDsig can vary depending on the change in the body diode voltage needed across the transistor 121, as part of the closed loop control offered by the voltage balancing circuit described herein.

The pulse trigger generator 232 is configured to generate a trigger signal Tsig based on a gate drive pulse signal Vpwm for the transistor 121. Vpwm is a pulse width modulated control signal, with pulses that vary in duration for the "on" cycle of the transistors 120 and 121 as compared to the "off" cycle of the transistors 120 and 121, for power control of the power converter 300. That is, Vpwm is generated by separate control circuitry that modulates the overall power output of the power converter 300. Tsig is a trigger signal that identifies the falling edges of the Vpwm signal. The falling edges of the Vpwm signal occur at the start of each "off" cycle for the transistors 120 and 121, and the pulse trigger generator 232 generates Tsig to identify the falling edges of the Vpwm signal.

The balancing pulse signal generator 224 receives the trigger and the pulse duration signals, Tsig and PDsig, as inputs. In one example, the balancing pulse signal generator 224 can be embodied as a digital delay line or programmable timing element, such as the DS1023 delay line manufactured by MAXIM INTEGRATED, although other suitable delay lines or equivalent circuitry can be relied upon. The balancing pulse signal generator 224 is configured to generate a balancing pulse signal Bsig based on the Tsig and PDsig signals. More particularly, Bsig includes a number of short gate pulse signals. A rising edge of each short gate pulse signal is timed to occur at some configurable delay time after the falling edges in the Vpwm signal, based on Tsig, and for a duration based on PDsig. The configurable delay time can be set in the controller 222 and/or in the balancing pulse signal generator 224 to be any suitable delay. The configurable delay time can be fixed in one example, although it can vary in some cases if needed.

The short gate pulses in the Bsig signal are combined with the on/off cycle gate pulses in the Vpwm signal by the combining logic 240, as shown in FIG. 4. The output of the combining logic 240 is provided to the gate driver 250, which can be embodied as any gate driver circuitry suitable for driving the gate of the transistor 121. Thus, gate control of the transistor 121 is augmented to include the short gate pulse signals in Bsig during off cycles for the transistor 121, leading to an adjustment of the body diode voltage across the transistor 121 during off cycles.

The voltage balancing circuit described herein can be realized locally at the power converter 300, along with the other gate driver circuitry, without significant modifications to the control of the power converter 300. The voltage balancing circuit also enables close loop control for voltage balancing among the transistors 120 and 121, without the need for measuring any parameters of the transistors 120 and 121.

Figure 5A:
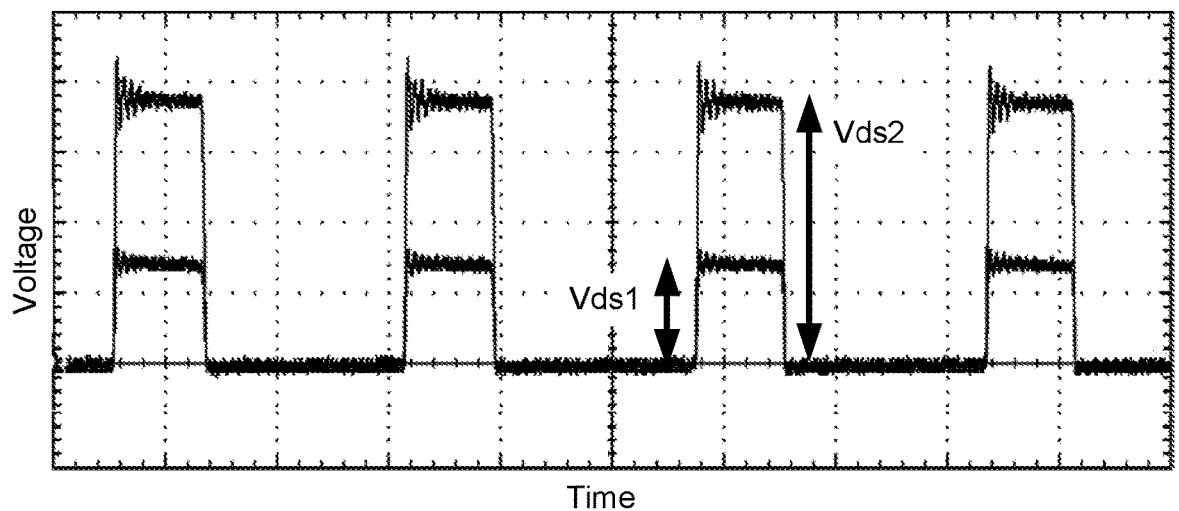
FIG. 5A illustrates example body diode voltages without using the voltage balancing circuit described herein according to various embodiments described herein.
Figure 5B:
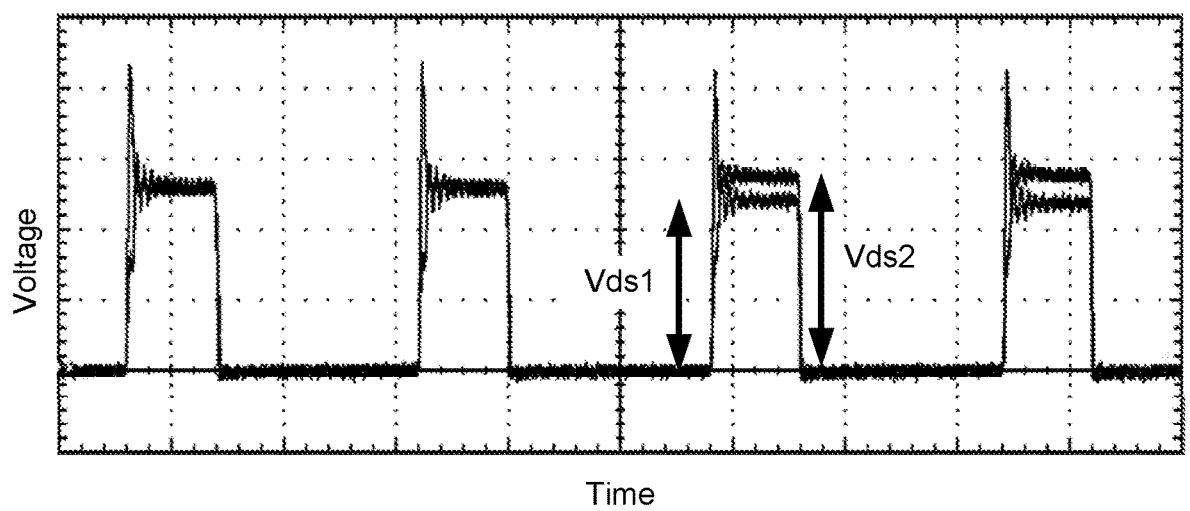
FIG. 5B illustrates example body diode voltages using the voltage balancing circuit described herein according to various embodiments described herein.

FIG. 5A illustrates example body diode voltages without using the voltage balancing circuit shown in FIG. 4, and FIG. 5B illustrates example body diode voltages using the voltage balancing circuit. In FIG. 5A illustrates example Vds1 and Vds2 voltages of the transistors 120 and 121 over time. A number of on/off cycles or periods of the transistors 120 and 121 are shown. During the on cycles, the Vds1 and Vds2 voltages across the body diodes of the transistors 120 and 121 are very low, as the transistors 120 and 121 are conducting. During the off cycles, the Vds1 and Vds2 voltages are higher, as the transistors 120 and 121 are off (e.g., blocking) and not conducting. Similar to FIG. 2, the Vds1 and Vds2 voltages are not balanced or equal during the off cycles in FIG. 5A. Instead, Vds2 is significantly larger than Vds1, meaning that the body diode voltage across the transistor 121 is larger than the body diode voltage across the transistor 120 during the off cycles. In FIG. 5B, however, the difference between the Vds1 and Vds2 voltages is much less. Vds2 is reduced, and Vds2 is increased, with better voltage sharing among the body diodes of the transistors 120 and 121.

The features, structures, or characteristics described above may be combined in one or more embodiments in any suitable manner, and the features discussed in the various embodiments are interchangeable, if possible. In the foregoing description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although relative terms of orientation, such as "above," "below," "upper," "lower," "under," and "over," may be used to describe the structural orientation of certain elements, the terms are used for convenience only, for example, as a direction in examples shown in the drawings. It should be understood that if the device is turned upside down, the "upper" component will become a "lower" component.

As used herein, terms such as "a," "an," "the," and "said" are used to indicate the presence of one or more elements and components. The terms "comprise," "comprising," "include," "including," "have," "having," "contain," "containing," and their variants are open ended and can include additional elements, components, etc., in addition to the listed elements, components, etc. unless otherwise specified. The terms "first," "second," etc. are used only as labels, rather than a limitation for a number of the objects.

The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. A voltage balancing circuit for a power converter, comprising:
    a measurement circuit electrically coupled to at least one node of a transistor in a pair of series-connected switching transistors, the measurement circuit being electrically coupled to measure a body voltage reference of the transistor at the at least one node; and
    a balancing circuit configured to generate a balancing pulse signal for adjusting a voltage across the transistor using the body voltage reference, the balancing pulse signal comprising a number of pulses triggered based upon a gate drive pulse signal for the transistor, where duration of the pulses varies in response to a change in the body voltage reference, the balancing pulse signal combined with the gate drive pulse signal to generate a balanced gate drive pulse signal for control of the transistor.

2. The voltage balancing circuit of claim 1, further comprising a circuit configured to combine the balancing pulse signal with the gate drive pulse signal for the transistor, to form the balanced gate drive pulse signal for the transistor.

3. The voltage balancing circuit of claim 2, wherein the balanced gate drive pulse signal substantially equalizes body diode voltages of the pair of series-connected switching transistors.

4. The voltage balancing circuit of claim 1, wherein:
    the measurement circuit comprises a voltage divider coupled between a drain and a source of the transistor; and
    the at least one node comprises a middle node in the voltage divider.

5. The voltage balancing circuit of claim 1, wherein the measurement circuit comprises a difference amplifier configured to provide a referenced body voltage for the transistor based on the body voltage reference.

6. The voltage balancing circuit of claim 5, wherein the measurement circuit comprises an analog to digital converter configured to convert the referenced body voltage to a digital body voltage reference.

7. The voltage balancing circuit of claim 1, wherein the balancing circuit comprises a pulse trigger generator, a pulse duration generator, and a balancing pulse signal generator.

8. The voltage balancing circuit of claim 7, wherein the pulse trigger generator is configured to generate a trigger signal based on the gate drive pulse signal for the transistor.

9. The voltage balancing circuit of claim 8, wherein the pulse duration generator is configured to generate a pulse duration signal based on the body voltage reference of the transistor.

10. The voltage balancing circuit of claim 9, wherein the balancing pulse signal generator is configured to generate the balancing pulse signal based on the trigger signal and the pulse duration signal.

11. The voltage balancing circuit of claim 1, wherein the pair of series-connected switching transistors comprises a pair of series-connected silicon carbide (SIC) semiconductor field effect transistors (MOSFETs).

12. The voltage balancing circuit of claim 1, wherein the pair of series-connected switching transistors comprises a pair of series-connected silicon carbide (SIC) semiconductor field effect transistors (MOSFETs) in an integrated transistor power module.

13. A power converter comprising a voltage balancing circuit, comprising:
  a pair of series-connected switching transistors for power conversion; and
  a voltage balancing control loop configured to substantially equalize body diode voltages of the pair of series-connected switching transistors, wherein the voltage balancing control loop comprises:
    a measurement circuit electrically coupled to at least one node of a transistor in the pair of series-connected switching transistors, the measurement circuit being electrically coupled to measure a body voltage reference of the transistor at the at least one node;
    a balancing circuit configured to generate a balancing pulse signal for adjusting a voltage across the transistor using the body voltage reference, the balancing pulse signal comprising a number of pulses triggered based upon a gate drive pulse signal for the transistor, where duration of the pulses varies in response to a change in the body voltage reference; and
    a circuit configured to combine the balancing pulse signal with the gate drive pulse signal for the transistor, to form a balanced gate drive pulse signal for control of the transistor, wherein the balanced gate drive pulse signal substantially equalizes the body diode voltages of the pair of series-connected switching transistors.

14. The power converter of claim 13, wherein:
the measurement circuit comprises a voltage divider coupled between a drain and a source of the transistor; and
the at least one node comprises a middle node in the voltage divider.

15. The power converter of claim 13, wherein the measurement circuit comprises a difference amplifier configured to provide a referenced body voltage for the transistor based on the body voltage reference.

16. The power converter of claim 15, wherein the measurement circuit comprises an analog to digital converter configured to convert the referenced body voltage to a digital body voltage reference.

17. The power converter of claim 13, wherein the balancing circuit comprises a pulse trigger generator, a pulse duration generator, and a balancing pulse signal generator.

18. The power converter of claim 17, wherein the pulse trigger generator is configured to generate a trigger signal based on the gate drive pulse signal for the transistor.

19. The power converter of claim 18, wherein the pulse duration generator is configured to generate a pulse duration signal based on the body voltage reference of the transistor.

20. The power converter of claim 19, wherein the balancing pulse signal generator is configured to generate the balancing pulse signal based on the trigger signal and the pulse duration signal.

* * * * *